No. 783,253. PATENTED FEB. 21, 1905.
B. F. FLEGEL.
FISH HOOK.
APPLICATION FILED SEPT. 2, 1904.
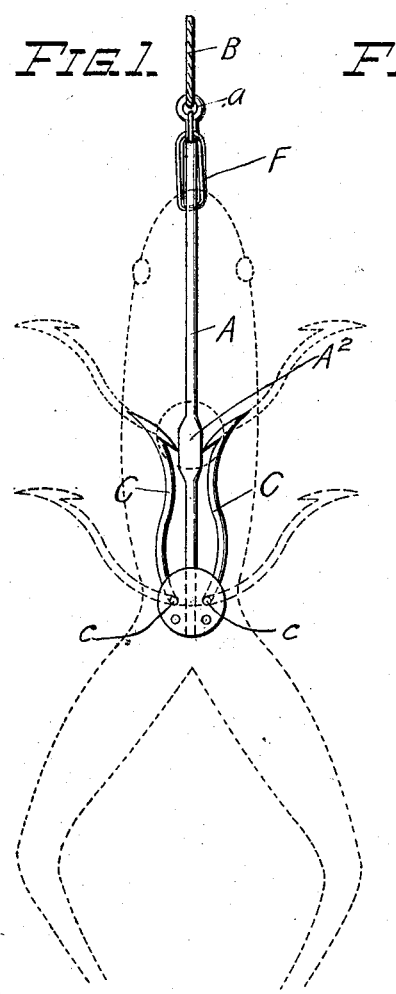
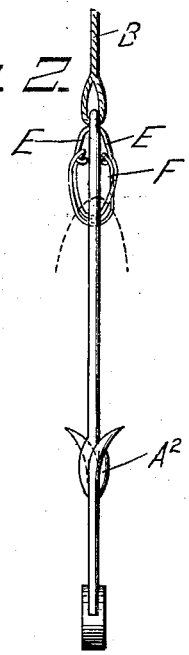
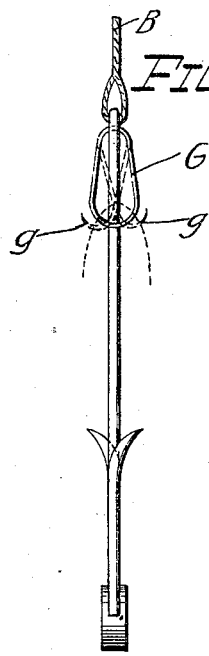
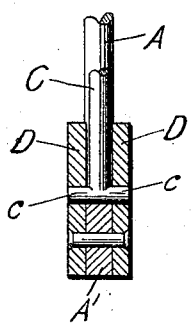
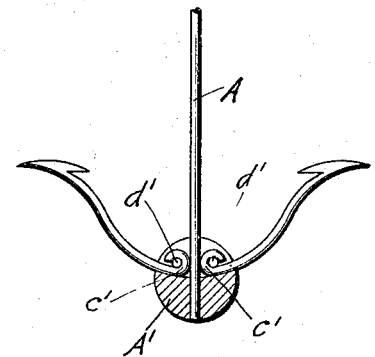
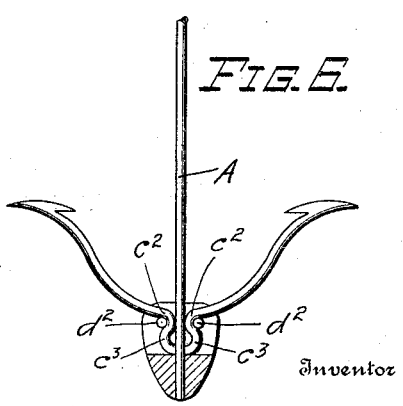
Inventor
Benjamin F. Flegel No. 783,253. Patented February 21, 1905.

UNITED STATES PATENT OFFICE.

BENJAMIN F. FLEGEL, OF RACINE, WISCONSIN.

FISH-HOOK.

SPECIFICATION forming part of Letters Patent No. 783,253, dated February 21, 1905.

Application filed September 2, 1904. Serial No. 223,142.

*To all whom it may concern:*

Be it known that I, BENJAMIN F. FLEGEL, of Racine, in the State of Wisconsin, have invented certain new and useful Improvements in Fish-Hooks; and I hereby declare that the following is a full, clear, and exact description thereof, reference being had to the accompanying drawings, which form part of this specification.

This invention is an improvement in fish-hooks; and its object is to provide an improved snare-hook which can be easily concealed in bait, such as frogs or minnows, without the barbs appearing or protruding, thus being less liable to catch snags than an ordinary hook, yet if the bait is "taken" the jerk on the hook will cause the barbs to spread apart and pierce through the sides of the bait and catch the fish firmly and securely, the resisting pull only causing a more firm engagement of the barbs, which catch the fish much farther down in its throat or mouth than the ordinary hooks will do.

The hook comprises a staff or shank to one end of which are pivoted divergent barbs adapted to be inserted in closed condition into the bait, and the other end of the shank is provided with means for holding the bait on the hook, and thus preventing the barbs opening until the bait is taken.

I will describe the invention with reference to the accompanying drawings, which show various forms of hooks embodying the invention, and refer to the claims for summaries thereof.

In the drawings, Figure 1 is a face view of the hook, showing the barbs closed in full lines and the position of the hook within a "bait." Fig. 2 is an edge view of Fig. 1; Fig. 3, an edge view of a similar hook with a modified "bait-holder." Fig. 4 is an enlarged detail section showing the preferred mode of attaching the barbs to the shank or stem. Figs. 5 and 6 are detail views showing other modes of attaching the barbs to the shank.

The shank A of the hook is preferably straight and has an eye $a$ on its upper end for connection to the line B. At the lower end of the shank are two diametrically opposite barbs C C, which are pivoted to the shank in such manner that they can swing outward in the plane of the shank. These barbs, as shown, are about one-third the length of the shank and are preferably provided with opposite lugs $c$ on their lower ends, forming it into a T-head, said lugs $c$ being confined in openings in opposed disks or plates D, which are attached to opposite sides of an enlargement or head A' on the lower end of the shank. The upper part of this head is cut away, so as to leave opposite slots or recesses $d$ above the pivots $c$ to permit the desired swinging movement of the barbs and to arrest the barbs when properly opened, as indicated in Figs. 1, 5, and 6. In lieu of the T-heads or pintles $c$ the barbs may be provided with eyes $c'$, pivoted on pins or rivets $d'$, as indicated in Fig. 5, or the barbs may have their lower ends bent, as at $c^2$, (see Fig. 6,) to engage pins or rivets $d^2$, the barbs being extended below the pins $d'$, as at $c^3$, such extensions serving to limit the opening movement of the barbs.

The shank may be provided with a collar or swell $A^2$ above the head A', with which the barbed ends of the barbs will contact when in closed position and as indicated in Figs. 1 and 2, such swell keeping the barbs properly separated when in closed position.

To the upper end of the shank is attached a bait-retaining device. This, as shown in Figs. 1 and 2, consists of two opposite eyes or catches E E, to which a tie F may be attached. This tie may be a cord or preferably a small rubber band, the opposite ends of which are engaged with the opposite catches E E, as shown. In Fig. 3 the bait-fastener is a double-pointed loop-hook G, which is hung in the eye $a$.

The manner of using my hooks is as follows: The bait—a frog or fish—is killed. Then the hook is inserted, barbed end first, into the stomach of the bait, the eye $a$ protruding slightly from its mouth. The tie F is caught on one catch E and then run through the lips of the bait, which is suitably punctured for that purpose, and then caught on the other catch E, as indicated in Figs. 1 and 2, thus holding the bait on the hook while the barbs lie close together. If now the bait is taken by a fish, the jerk on the line B pulls the bait back on the hook and the barbs open outwardly, as indicated in dotted lines, Fig. 1, impaling the fish securely and so far within its jaws or throat that escape is impossible. The barbs, of course, pierce the sides of the bait and catch the fish, as is evident. With the bait-holder shown in Fig. 3 the hook is placed in the bait as described. Then the loop-hook G is spread apart so that its points $g$ engage the opposite jaws of the bait, holding them securely closed and preventing the barbs opening until the bait is taken.

Preferably the points $c^3$ of the barbs are slightly bent laterally in opposite directions, as indicated in Figs. 2 and 3, which will prevent the hook slipping out of the bait should the mouth thereof be partly open.

Having thus described my invention, what I therefore claim as new, and desire to secure by Letters Patent thereon, is—

1. A fish-hook having pivoted swinging barbs, bait-retaining devices above the barbs, comprising opposite catches attached to the shank, and a tie secured to said catches and threaded through the bait, substantially as described.

2. A fish-hook comprising a shank having an eye at one end, a head at the other end, and an intermediate swell; barbs pivotally connected to the head of the shank, and adapted to close against the swell thereon, and a bait-retainer attached to the shank adjacent to the eye, substantially as described.

3. A fish-hook having a shank, and opposite swinging barbs pivoted thereto having their points bent or deflected laterally, substantially as and for the purpose described.

4. A fish-hook, having a shank provided with a head at one end, and barbs having T ends pivoted in recesses in said head, substantially as described.

5. A fish-hook having a shank provided with a recessed head at one end, and barbs having T ends pivoted in the recesses of said head; with a bait-retaining device at the other end of the hook.

6. A fish-hook having a shank, opposite barbs pivoted to the end of the shank opposite the end to which the line is connected, and a bait-retaining device on the shank above the barbs, substantially as described.

7. A fish-hook having a shank provided with a swell and barbs pivoted to the shank at the end opposite the end to which the line is connected and below the swell, and adapted to be closed upwardly against the swell, substantially as described.

8. A fish-hook having a shank, barbs pivoted to the end of the shank opposite the end to which the line is connected adapted to be concealed in the bait and to swing outward piercing the bait when the latter is "taken," and a bait-retainer attached to the shank above the free ends of the barbs.

9. A fish-hook comprising a shank having a line connection at one end, and an enlargement or head at the other end provided with slots, and barbs pivoted in said slots and closable toward the line connection, substantially as described.

10. A fish-hook comprising a shank having a line connection at one end, and an enlargement or head at the other end provided with slots, and barbs pivoted in said slots and closable toward the line connections; with a bait-retainer on the other end of the hook.

In testimony that I claim the foregoing as my own I affix my signature in presence of two witnesses.

BENJAMIN F. FLEGEL.

In presence of—
 N. S. WAIT,
 J. P. WILLIAMS.